Dec. 13, 1955    M. F. CHUBB ET AL    2,727,082
SILVER PEROXIDE BATTERY

Filed Sept. 26, 1952    2 Sheets-Sheet 1

INVENTORS.
Melvin F. Chubb.
James M. Llines.
BY Wood, Herron & Evans.
ATTORNEYS.

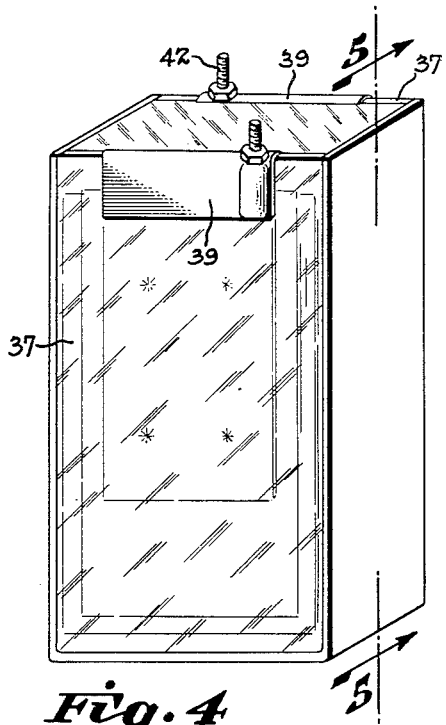
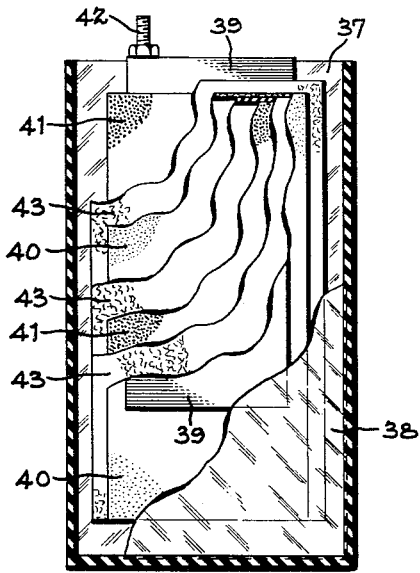
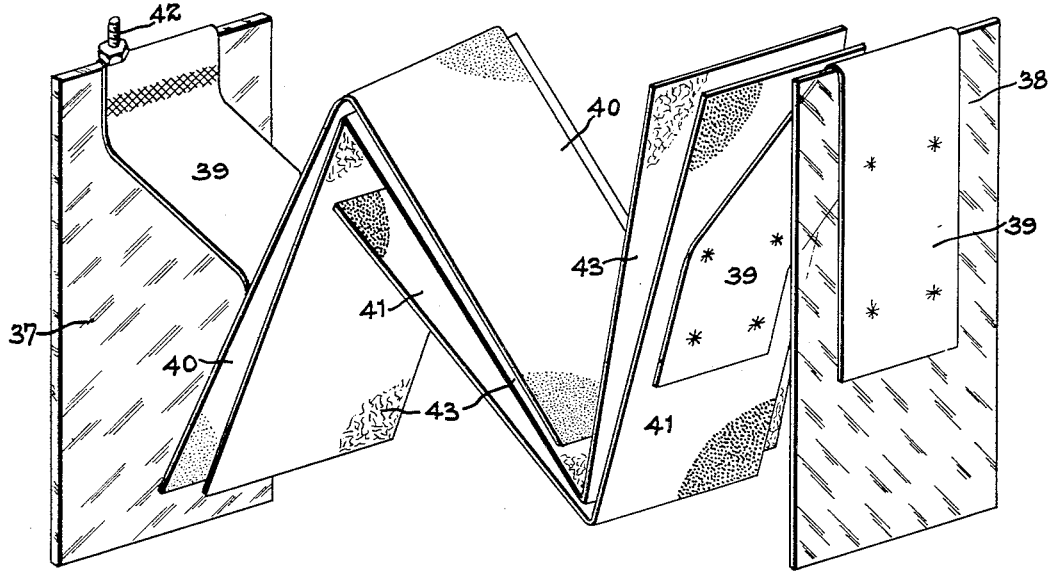

United States Patent Office 2,727,082
Patented Dec. 13, 1955

2,727,082
SILVER PEROXIDE BATTERY

Melvin F. Chubb and James M. Dines, Joplin, Mo., assignors to The Eagle-Picher Company Application September 26, 1952, Serial No. 311,688

4 Claims. (Cl. 136—30)

This invention relates to a new line of batteries which are constituted by silver peroxide zinc electrolytic cells and which may be built for and used as either special purpose primary batteries or rechargeable storage batteries. The general chemical and electrolytic principles of this type of cell have long been known and the theoretical aspects investigated experimentally, but actual service batteries constituted by such cells have not been heretofore available commercially because of the many serious practical difficulties which are involved in the quantity production of sufficiently dependable and uniform silver peroxide zinc batteries. Silver is far more expensive than competitive battery making metals, such as lead, and up to now no commercial battery utilizing a silver peroxide positive electrode has been designed which justified the inherently high cost of the silver and of the exacting process of fabricating it into an efficient positive electrode.

As a matter of theory, the silver peroxide zinc battery may be as much as three times as efficient as a standard lead acid battery, on the basis of electrical power (watt hours) delivered per unit of battery weight, and this favorable power to weight ratio is manifestly desirable for many usages, among which provision of current for airborne electrical equipment may be taken as typical.

The method of preparing silver peroxide plates for experimental cells is stated by Vinal in his Primary Batteries, copyright 1950, as follows:

"The electrodes may be prepared in any one of several different ways. In general the object is to make thin plates as the batteries are usually intended for discharge at high rates. The grid is copper-wire screen, silver or nickel plated, of about 50 by 50 mesh. The active material is applied to this grid as a paste in somewhat the same way that lead storage battery plates are pasted. The paste is a mixture of silver oxide powder and the amount of water necessary to make it a convenient consistency for application to the grid with a spatula. After one side of the plates has been pasted it is reversed and pasted on the other side. The plates are then dried at about 85° C. In this condition they may be used as silver oxide, $Ag_2O$, but it is more usual to form them to the higher oxide, $Ag_2O_2$.

"The dried plate containing the oxide, $Ag_2O$, is first heated in a muffle furnace at a temperature of about 500° C. for 10 minutes or more, depending on the temperature, to reduce the oxide and to sinter the particles of silver into a coherent mass. At this stage active material is all silver in a finely divided or spongy state. It may be pressed to produce a plate of specified thickness. The silver is formed to the peroxide state electrolytically in a 5 per cent solution of potassium hydroxide. This process is best carried out slowly at a low current density. Sixteen to 20 hours are required to complete the process. Initially the voltage against zinc is about 1.7 volts, but after a short time this increases to slightly over 2 volts. Near the end of the charge there is a further rise to about 2.3 volts and oxygen evolution occurs. The plate at this time contains the peroxide, $Ag_2O_2$, but the efficiency with which it may be used on discharge varies with the conditions under which it was formed."

The use of the silver peroxide electrode, although expensive from the point of view of raw material and fabrication costs, is desirable for use in batteries for at least four reasons: (1) because the electrode is spongy and tends to open up to maintain its initial efficiency as the silver peroxide is reduced to silver; (2) because the silver peroxide electrode is inherently strong physically and does not lose physical strength as the reduction to metallic silver proceeds; (3) because the inherent current yielding value of silver peroxide as a depolarizing material is higher than that of any other known chemical on a weight or volume or molar bases; and (4) because the full current delivery of the battery may be attained within one minute after activation by contacting the electrodes and electrolyte.

However, to warrent the expense of the use of silver, the components of the completed battery, other than the electrodes themselves, must be characterized by a lightness and a dependability which is commensurate with that of the electrodes. For instance, if the battery case is heavy in weight in relation to the weight of the electrodes, then some of the advantage of building a battery around the more efficient and relatively light electrodes is lost. In other words, the desirable power to weight ratio of the electrodes, per se, must also characterize the finished battery as a whole, if the cost of the silver is to be justified.

Conventionally, the silver peroxide zinc cell uses an aqueous solution of substantially 20 to 50 per cent by weight of caustic potash, a 30 per cent solution being typical. Solutions of other alkali metal hydroxides may be used in place of the caustic potash solution, or an alkali metal alcoholate may be used as the electrolyte. Primarily, the batteries of this invention are designed to be used with a 30 per cent caustic potash solution, and the disclosed physical characteristics of the plates particularly suit them for use with this electrolyte.

From the point of view of producing a battery which is of the lightest possible weight in relation to generating capacity, the quantity of electrolyte employed in the cells is also a consideration of significance. Obviously, the quantity of electrolyte employed should be the minimum required, so that weight and volume are both conserved. In a silver peroxide zinc battery, no great quantity of electrolyte is required and it is, therefore, convenient and expedient to engage the electrolyte with the electrode plates by holding the electrolyte on a bibulous electrode separator which also provides insulation between the plates in whole or in part. By using relatively thin electrodes, sufficient electrolyte to exhaust their active chemicals may be placed on a pad between them which is not sufficiently thick to unduly elevate the internal resistance of the cell.

Thus it is possible to fabricate batteries composed of from 6 to 10 individual cells per lineal inch of battery length, the electrodes of the battery being of any desired area. At 1.6 volts potential per cell, this type of fabrication provides substantially 9 to 16 volts per inch of battery length when the cells are connected in series.

In building a battery from a series connected group of cells of this type, possibility of short circuiting between the cells must be obviated. This can, of course, be done by disposing the electrodes in a molded battery case having a multiplicity of individuated cell compartments, but this expedient requires an individual case mold for each size of battery. Further, the molded battery case is not durable unless quite heavy. This invention therefore contemplates the provision of a battery construction which is flexible in two senses of the word: (1) any desired number of series connected cells may be combined into an integrated battery structure without intracell short circuiting, and (2) this battery structure is physically flexible or resilient as a whole and will not crack or break like a molded case.

A better understanding of the nature of the line of batteries to which this invention is directed is provided in the description of the accompanying drawings in which:

Figure 4 is a perspective view of a battery which utilizes a plurality of cells connected in series, each cell constituted by a plurality of electrode plates which are connected together in parallel both physically and electrically.

Figure 5 is a cross sectional view taken on line 5—5 of Figure 4.

Figure 6 is an exploded view, in perspective, illustrating the arrangement of the plates constituting one of the cells of the battery shown in Figure 4.

Figure 1:
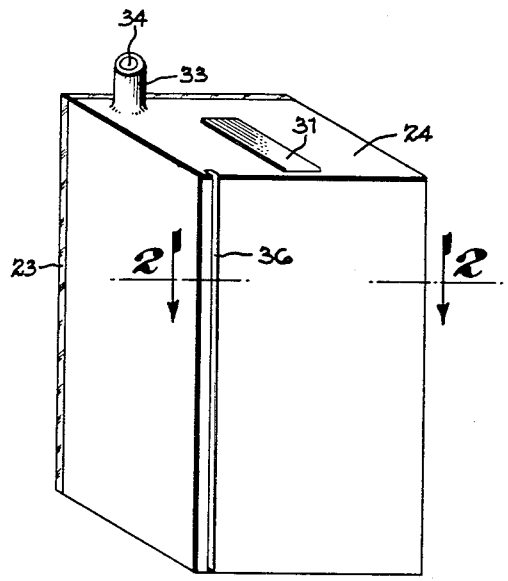
Figure 1 is a perspective view of a battery which comprises a stack of cell constituting electrodes connected in series. In this type of battery, the electrodes and battery case are structurally united to provide an integral unit so that the individual electrodes cannot be removed from the cells without destroying the battery.

The battery case and electrode assemblies disclosed in the drawings are rugged and may be dropped or bounced on a concrete floor from considerable height without damage to the battery. Further, these constructions do not utilize a molded battery case, and hence, may be made to occupy minimum volume in relation to the chosen electrode area of each size battery. Further, these battery case constructions are particularly suitable for batteries made up of a multiplicity of cells connected in series because the use of the molded case is avoided and a battery of any desired number of cells may be made up without changing the fabricating technique.

Figure 3:
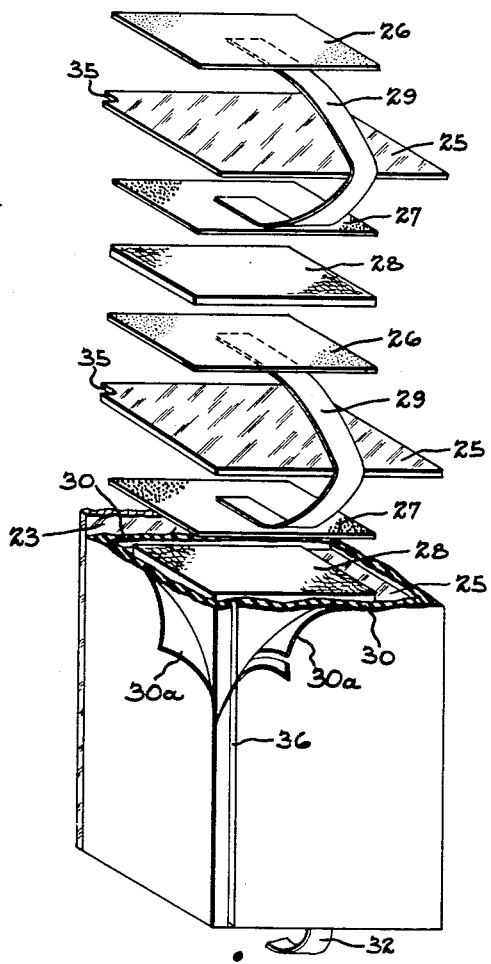
Figure 3 is an exploded view, in perspective, of the battery of Figure 2.
Figure 2:
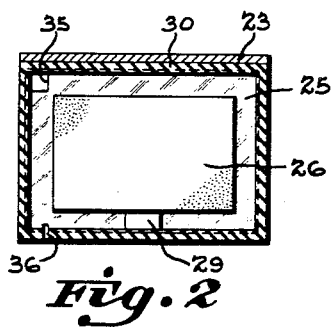
Figure 2 is a cross sectional view taken on line 2—2 of Figure 1.

The battery disclosed in Figures 1, 2 and 3 comprises an integral base piece 23, two end pieces 24 and a series of cell partitions 25. Preferably, these elements are fabricated from very thin sections of a plastic sheet material which is chemically resistant, physically strong and not brittle. The spaces defined by the distances between the partitions and the distances between the partitions and the end walls constitute the individual cell compartments of the completed battery. In each cell, a positive electrode 26 and a negative electrode 27 are disposed. As disclosed, the positive and negative electrodes of each cell are separated by an electrical insulating diaphragm 28 constituted by a layer of bibulous material. (The possible and desirable arrangements of intracellular insulating and/or spacing materials will be more fully discussed at a later point.) The positive of one cell is connected with the negative of the adjacent cell by means of a connecter strip 29 which passes over the top of the intervening cell partition. (The "top" of the battery is toward the front in Figure 1.) Preferably the electrodes are welded to the connecter strip and the connecter strip is cemented to the cell partition which supports it. The terminal electrodes of the battery are similarly connected to the end plates. This provides a series connection, but parallel connections may be provided where desired to make up a unitary battery of any desired number of cells which may be connected in series and/or in parallel.

In assembling a battery of the type disclosed, the electrodes, spacing materials, cell partitions and end walls are stacked together and pressed together sufficiently to constitute a length just equal to that of the base piece 23. A layer of adhesive plastic material 30, which may be very thin in relation to the base piece, is then coated on the top face of base piece 23 and the stack or pile then placed upon it so that the end walls and cell separators are embedded in the adhesive plastic. Next a thin flexible sheet 30a of cellulosic material (see Figure 3) is given a coating on one side with the same adhesive plastic and this sheet is applied to the three side walls of the stack. Positive terminal 31 and negative terminal 32 extend through each end plate but the electrodes themselves are entirely encased by the plastic coated sheeting. The adhesive plastic used to coat the sheet material is then thermally set by heat treatment.

As disclosed, this battery is constructed so that it may be activated by introduction of electrolyte just prior to use. The electrolyte may be introduced into the battery by inserting a hypodermic needle through a nipple 33 which extends from one end plate of the battery, the nipple being closed by a special membrane 34 which has a consistency which the needle may penetrate. In line with this nipple, the cell separators have been cut away at their corners, as at 35, to provide a passageway from one end of the battery to the other through which the electrolyte may pass. In order to permit the electrolyte to displace the air between the battery plates, each cell has an opening, as at 36, adjacent to its top—these cell openings as disclosed being constituted by a cut through a side wall of the battery adjacent to the top of the battery.

This type of battery is shipped and stored in dry condition and is activated immediately prior to use. As disclosed, the battery of Figures 1–3 is a one-shot primary battery intended for rapid discharge, but the same fabricating technique and integrated electrode and battery case structure may be used for batteries of other types, including storage batteries, if appropriate dielectric diaphragms are included.

The battery construction disclosed in Figures 4–6 is particularly desirable for silver peroxide zinc batteries because the construction may be used to make batteries of almost any desired current generating characteristics from relatively standard electrode and case constituting elements. As indicated, the silver peroxide battery is too inherently expensive to replace the lead acid battery for uses such as in automobiles and in fact, there would not be enough silver available to supply all automobiles with silver peroxide batteries, even if the superiority of the silver peroxide batteries over the lead acid batteries warranted the substitution on the basis of the present cost of silver.

It follows that the silver peroxide batteries will be used primarily for special purposes, in each of which a battery of very specific characteristics will be required. A specially molded battery case for each particular size of battery would be uneconomical at least for a substantial proportion of the market, and if silver peroxide electrode assemblies were mounted in oversize cases then the advantage of the more expensive batteries would be sacrificed, at least in part.

In the battery of Figures 4–6, any desired number of cells may be assembled in a single integral battery and connected in series. Also, the electrode area of each cell may be made of any desired magnitude without varying the diameter of the battery. In other words, a battery having an end six inches square (for example) may be made of any desired length and the number of cells may be multiplied or the thickness of the individual cells may be multiplied, or both. This end is accomplished by using a battery construction similar to the construction disclosed in Figures 1–3 but with fan-folded electrodes in each cell. By multiplying the number of fan folds, the electrode area of each cell may be extended as desired, yet batteries of different current values and overall sizes may be constructed from the same electrode materials and from the same case constituting materials.

More specifically, two end plates 37 and a series of cell partitions 38 of the same lineal outline, i. e. of congruous face areas, are assembled in a stack with the electrodes between the cell partitions and between each end plate and the next adjacent cell partition. A composite electrode structure is attached to and supported by each cell partition. The composite electrode structure comprises a connecting strip 39 of metal such as copper which may be cemented about one edge of each cell partition. On one side, a positive electrode 40 is affixed to the connecting strip and, on the other side, a negative electrode 41 is affixed to the connecting strip. With silver peroxide and zinc plates and a copper connecting strip the electrical connection between the plates and the strip may be constituted by pressure contact or permanent affixment. At the ends of the battery, the metal strips 39 may be cemented to the end plates 37 and suitable terminals such as those shown at 42 soldered in place.

As disclosed in Figure 6, each electrode is bent on itself to constitute two plates of substantially equal area, the bend of the positive plate 40 being at the top (as disclosed) and the bend of the negative plate 41 at the bottom so that the inner folds of the two plates may be interleaved to provide a four-plate cell (two positives and two negatives). A fan-folded or Z-shaped electrode separator 43 is inserted between the two plates to insulate them, the exact character of the separator depending upon the use for which the battery is intended. By extending the fan folding, a cell of any desired amperage may be constituted, and by extending the number of cells, a battery of any desired voltage may be built.

The bottom side walls and top of a battery of this type may be fabricated by coating sheet material with plastic which adheres to the battery separators and end plates, wrapping the sides of the battery in whole or in part with the plastic coated sheeting, then setting the plastic by heat treatment. Alternatively, sheet material such as used for the end plate may be cut to proper dimension for the bottom, top and side walls and this sheet material coated with plastic applied to the battery sides, then set by heat treatment. Or the plate and wrapping techniques may be combined to provide a cell enclosure of the desired characteristics. In any case, the end product is a laminated stack of cell partitions, electrodes and electrode spacers which as a whole is slightly flexible and will not fracture or break on dropping. Preferably, the side walls of the battery are fabricated with the end plates under slight pressure so that all of the laminations are pressed together and held in their proper respective relationships frictionally, as well as otherwise.

In summary, the batteries of the present invention utilize platelike silver peroxide positives which are reduced to metallic silver as the battery discharges. These silver peroxide plates are fabricated by a technique of the general nature disclosed by Vinal, wherein the silver content of the positive electrodes is unified by sintering so that as reduction of the oxide proceeds, the resulting free silver adheres to the grid as a coherent mass. Inherently, such an electrode retains or tends to retain an all-metal framework or skeleton, even if alternately oxidized and reduced, and this all-metal framework or skeleton gives the electrode a fair measure of physical strength or stability so that when it is affixed to a flexible or resilient cell partition of slightly greater over-all surface area than the electrode itself, the cell partition is reinforced or strengthened by the electrode which is inherently less flexible or resilient than the cell partition. Thus, if the cell partition is marginally supported with the silver peroxide electrode affixed to it, with a margin of the cell partition projecting beyond the periphery of the electrodes, such projecting margin of the cell partition serves in effect as a resilient mounting for the electrode, which is free to move physically in a line at right angles to the center of its face (substantially), to accommodate its position to the internal physical pressures which exist within the cell, to equalize them.

In effect, this arrangement provides a stack of floating electrodes mounted on resilient cell partitions which construction is particularly valuable when used in combination with bibulous electrode separators or pads each of which from cell to cell should hold the same amount of electrolyte and should provide the same exposure or intimacy of interface between the bibulous separators and the electrode surface. While positive plates other than the silver peroxide plates may be substituted while still utilizing the construction of this invention, silver peroxide is a highly electropositive compound, and this, together with its reduction to metallic silver on discharge, makes it practically the ideal for positive battery plates from every point of view save cost. The battery construction of this invention may be used with other positive electrodes which are non-shedding, that is, which are characterized by integrated metallic frameworks or skeletons.

Preferably, the negative electrode is also a platelike structure of physical strength akin to that of the positive so that each cell partition is reinforced by the two electrodes which it supports on its opposite sides. On this account, as well as others, an electroplated zinc negative electrode which has an appropriate density in relation to the density of the silver peroxide positive electrode is desirable. From the point of view of battery structure, other platelike negative electrodes may be substituted for the zinc negatives. The combination, however, of the sintered platelike silver peroxide positive electrode and the electroplated compacted zinc platelike negative electrode of this invention provides a lightweight, but durable, battery structure which is capable of delivering a very high total quantity of ions of opposite polarity in relation to the total weight and physical strength of the battery as a whole. These batteries do not have "cases" in the ordinary sense of the term as understood in the battery art. To the contrary, the electrodes and electrode supporting elements are combined into an integrated structure wherein the electrodes are technically housed, but wherein the electrodes themselves reinforce or contribute to the strength of the battery structure as a whole. These batteries are physically flexible and may be bent or even bounced on concrete without damage.

However, in spite of the strength of the plate electrodes, physical vibration over a long period of time does tend to weaken or disintegrate the electrodes, inasmuch as the active electrode material is spongy and is physically, rather than chemically affixed or bonded to the grids or screens about which the electrode is formed. The battery construction of this invention is of value in tending to minimize vibration which might be bad for the electrodes, and, from any point of view, the mounting of the electrodes on resilient diaphragms (cell partitions) which are themselves held in assembly by resilient materials, and cushioning the electrodes between pads of bibulous electrode separating material, reduces the vulnerability of the electrodes to vibratory disintegration to a minimum.

This general type of battery structure is also disclosed in the co-pending application of Chubb and Dines, Serial No. 311,687, filed September 26, 1952, entitled "Method of Constructing Batteries," which discloses and claims a development over the battery structures disclosed in the co-pending application of Chubb, Serial No. 172,558, filed July 7, 1950, entitled "Electric Battery," now Patent No. 2,684,395 and Serial No. 181,248, filed August 24, 1950, entitled "Method of Making Electric Batteries," now Patent No. 2,684,481. The claims in the present case, in so far as they include this type of battery structure, are limited to the use of relatively flexible cell partitions which are disposed between platelike electrodes which tend to supplement the structural strength of the cell partitions, whereby the battery, as a whole, is adequately rigid without being vulnerably brittle. In this regard, the platelike sintered silver peroxide positive electrode and the compacted zinc negative electrode of this application cooperate with the thin resilient plastic cell partitions to provide the desired over-all effect. Claims directed to this type of battery construction, irrespective of the nature of the electrodes, or the complementary character of the cell partitions, as well as claims on the method of constructing a battery appear in said co-pending application of Chubb and Dines.

In view of the many plastic materials which are presently available, no list of specific plastics which purports to be comprehensive is possible. As a matter of generality, this invention contemplates the use of resilient or plastic sheet materials in combination with plastic cement which binds the sheet materials together, as explained. The plastic sheet materials and the plastic cement must be compatible in the sense that the plastic cement must be adhesive in relation to the sheet material; thus, various systems of compatible plastics are possible.

For instance, the plastic sheet material may be constituted by vinyl resin, chlorinated rubber or methyl methacrylate, or a combination of them, and the plastic adhesive may be a thermally set copolymer of vinyl chloride and vinyl acetate appropriately plasticized, as more particularly described in the identified co-pending application of Chubb and Dines. The walls of the battery need not necessarily be of uniform thickness and it is possible, for instance, to combine a relatively thick stable bottom member and stable end plates with lighter top and sides. It is, also, possible to constitute the top, bottom and/or side walls by applying the plastic cement to thin paper-weight cellulosic sheeting, then applying the sheeting to the battery and thermally setting the cement. The thin cellulose sheeting may be removed if desired after completion of the battery, but preferably the light sheeting is chosen to bond to the cement to provide a clean, smooth, untacky finish for the exterior of the battery. While not absolutely necessary, it is considered preferable that at least two opposite side walls of the battery have the similar construction as far as strength of materials is concerned in order to provide rigidity which is symmetrical in at least one plane.

The type of electrode housing or battery case which has been described is particularly suitable for use with silver peroxide zinc electrodes and a particular type of electrode separating membrane which expands when wet with the electrolyte. Since the electrode housing or battery casing is stretchable or flexible, the stack of elements which constitutes the battery may be assembled under slight pressure as described, then bound together with the thermally setting cement and later activated with electrolyte. The expansion of the electrode separating material is permitted by the stretchability of the plastic thermally setting cement. If the electrodes were housed in a rigid battery case, then it would either be necessary to space them very accurately in assembling the battery structure to permit room for expansion of the electrode separating material, or if this were not done, then the molded case would crack or tend to crack when the expansion took place. The combination of the stretchable electrode housing and the expansible electrode separators provides a combination which facilitates battery assembly and also insures equalization of internal pressures and spacing after the battery is activated so that the cells have substantially uniform internal resistance, and the final space of the electrodes of any given cell is finally determined by the expansion of the electrode spacing material which exerts a force counter to the binding action of the thermally setting cement.

A type of electrode separating material which expands when wet is disclosed in co-pending application, Serial No. 311,752, filed September 26, 1952, entitled "Silver Peroxide Battery and Method of Making." This application discloses the use of a regenerated cellulose electrode separator, the regenerated cellulose being in the form of a sheeting of the type used for sausage casing and having a thickness of from 1 to 6 millimeters.

If the battery is a one-trip battery, that is, intended to discharge but once, this regenerated cellulose sheeting should be treated with caustic such as a 30 per cent aqueous potassium hydroxide solution, then dried under tension to avoid wrinkling. Apparently the caustic reacts with the cellulosic material; at least it modifies the cellulosic structure to improve the characteristics of the battery. If, on the other hand, the battery is to be used as a storage battery, this pretreatment of the regenerated cellulose sheeting is not necessary and the desired alteration of the sheeting takes place in the presence of the caustic electrolyte.

Usually, it is desirable to use this regenerated cellulose electrode separator in combination with some form of bibulous pad so that all of the electrolyte which is needed for operating the battery is held by the porous electrodes themselves, the bibulous pad and the regenerated cellulose which may swell up to hold as much as three times its dry volume of electrolyte when wet with it. This swelling forces the regenerated cellulose sheeting and bibulous separating material into surface engagement with the electrodes.

If, as disclosed herein, the electrode housing or battery case is actually stretchable, then the battery elongates slightly as a consequence of the swelling after the electrolyte is introduced, and the electrode spacing is substantially equalized by the internal pressure so that the otherwise requisite operation of accurately spacing the electrodes in building the battery is obviated. Further, since the internal resistance of any given cell is in part a function of the distance by which its constituting electrodes are separated, the compression which the housing or casing or side walls exert upon the stack as a whole tends to reduce and maintain the electrode spacing at a minimum which is determined by the tendency of the regenerated cellulose to expand against the counter pressure of the elastic cement which constitutes the housing or casing or side walls.

The features described herein are conjointly contributory to the production of a light, powerful battery built around a highly efficient, but relatively expensive, silver peroxide positive electrode, a battery of the lightest possible weight and greatest possible dependability in relation to its ability to deliver current. By combining several or all of these features into a single battery, a commercial silver peroxide service battery having economic justification is accomplished.

Having described our invention, we claim:

1. A structurally integral electrolytic battery having a plurality of series connected cells of the silver peroxide zinc type, said battery comprising two end plates and one or more cell partitions, each end plate and partition consisting of a plastic sheet having a facial area congruous with that of each other sheet, means for holding the respective edges of said plastic sheets together in alignment with one another, said means comprising a layer of plastic adhesively affixed to the edgewise portions of said plastic sheets in liquid-tight relation thereto on at least two opposite sides thereof to constitute side walls of the battery and a plurality of included cell compartments, a composite electrode structure connected to each cell partition and supported thereby, said structure comprising a metal strip cemented over an edge of the cell partition, a plate like silver peroxide electrode engaging the metal strip on one side of the partition, a plate-like sponge zinc electrode engaging the metal strip on the other side of the partition, a terminal strip disposed in the inside of each end plate with an electrode therewith to provide a positive electrode and a negative electrode in each cell compartment and bibulous electrode spacing means disposed in each cell to separate the positive and negative electrodes thereof, the overall spacing of the end plates being related to the combined thickness of the electrodes, partitions and separators so that the end plates hold the elements together in assembly under slight, but tangible, pressure.

2. A structurally integral electrolytic battery having a plurality of series connected cells of the silver peroxide zinc type, said battery comprising two end plates and one or more cell partitions, each end plate and partition consisting of a plastic sheet having a facial area congruous with that of each other sheet, means for holding the respective edges of said plastic sheets together in alignment with one another, said means comprising a layer of plastic affixed to the edges of said plastic sheets on at least two opposite sides thereof to constitute side walls of the battery and a plurality of included cell compartments, a composite electrode structure connected to each cell partition and supported thereby, said structure comprising a metal strip cemented over the edge of a cell partition, a plate-like silver peroxide electrode contacting the metal strip on one side of the partition, a plate-like sponge zinc electrode contacting the metal strip on the other side of the partition and bibulous electrode spacing means disposed in each cell to separate the positive and negative electrodes thereof, the overall spacing of the end plates being related to the combined thickness of the electrodes, partitions and separators so that the end plates hold them together in assembly under slight positive pressure.

3. A battery comprising a plurality of series connected cells, each cell constituted by a silver peroxide positive electrode, a zinc negative electrode and electrode separating material in each cell, said material adapted to expand when wet with electrolyte and a flexible housing for said electrodes adapted to expand responsively to pressure and to confine said electrodes under said pressure when the electrode separating material is wet with electrolyte.

4. A battery comprising a plurality of series connected cells, each cell constituted by a silver peroxide positive electrode, a zinc negative electrode and electrode separating material in each cell comprising regenerated cellulose, said material adapted to expand when wet with electrolyte to approximately three times its dry volume and a flexible housing for said electrodes adapted to expand responsively to pressure and to confine said electrodes under said pressure when the electrode separating material is wet with electrolyte, said housing constituted by thermally set vinyl plastic.

References Cited in the file of this patent

UNITED STATES PATENTS

| | | |
|---|---|---|
| 1,631,568 | Yngve | June 7, 1927 |
| 2,307,769 | Deibel | Jan. 12, 1943 |
| 2,317,711 | Andre | Apr. 27, 1943 |
| 2,324,024 | Ream | July 13, 1943 |
| 2,516,084 | Wells | July 18, 1950 |
| 2,564,495 | Mullen | Aug. 14, 1951 |
| 2,594,709 | Andre | Apr. 29, 1952 |
| 2,602,843 | Brennan | July 8, 1952 |
| 2,632,784 | Marsal et al. | Mar. 24, 1953 |
| 2,634,305 | Davis | Apr. 7, 1953 |